United States Patent
Imamura et al.

(10) Patent No.: US 10,931,834 B2
(45) Date of Patent: Feb. 23, 2021

(54) INFORMATION PROCESSING APPARATUS (71) Applicant: FUJI XEROX CO., LTD., Tokyo (JP)

(72) Inventors: Kenji Imamura, Kanagawa (JP); Masahiro Kobata, Kanagawa (JP); Shinho Ikeda, Kanagawa (JP); Tokuji Ueda, Kanagawa (JP); Takanori Fukuoka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 168 days.

(21) Appl. No.: 16/053,999

(22) Filed: Aug. 3, 2018

(65) Prior Publication Data
US 2019/0058801 A1 Feb. 21, 2019

(30) Foreign Application Priority Data
Aug. 17, 2017 (JP) .............................. JP2017-157639

(51) Int. Cl.
*G06F 3/12* (2006.01)
*H04N 1/00* (2006.01)

(52) U.S. Cl.
CPC ....... *H04N 1/00233* (2013.01); *G06F 3/1205* (2013.01); *G06F 3/1226* (2013.01); *G06F 3/1231* (2013.01); *G06F 3/1286* (2013.01); *H04N 1/00225* (2013.01); *H04N 1/00236* (2013.01)

(58) Field of Classification Search
CPC ........... H04N 1/00233; H04N 1/00225; H04N 1/00236; G06F 3/1205; G06F 3/1206; G06F 3/1226; G06F 3/1231; G06F 3/1286
See application file for complete search history.

(56) References Cited

U.S. PATENT DOCUMENTS

| 2016/0196482 A1* | 7/2016 | Nakamura | ............ G06F 3/1228 |
| | | | 358/1.15 |
| 2016/0224355 A1* | 8/2016 | Okubo | .................... G06F 9/541 |

FOREIGN PATENT DOCUMENTS

| JP | 2006-304368 A | 11/2006 |
| JP | 2009-086832 A | 4/2009 |

* cited by examiner

*Primary Examiner* — Moustapha Diaby
(74) *Attorney, Agent, or Firm* — Oliff PLC (57) ABSTRACT

An information processing apparatus includes a first controller and a second controller. The first controller performs processing dependent on hardware having a function. The second controller is connected to the first controller via a communication path and performs processing not dependent on the hardware. The second controller stores an execution command in a storage device. The execution command is for executing processing and has a format not dependent on the hardware. The first controller includes a converter, a memory controller, and an operation controller. The converter acquires the execution command from the storage device and converts the execution command into a command for controlling the hardware and dependent on the hardware. The memory controller writes the converted command into a memory. The operation controller reads the converted command from the memory and controls operation of the hardware.

9 Claims, 4 Drawing Sheets

INFORMATION PROCESSING APPARATUS

CROSS-REFERENCE TO RELATED APPLICATIONS

This application is based on and claims priority under 35 USC 119 from Japanese Patent Application No. 2017-157639 filed Aug. 17, 2017.

BACKGROUND

Technical Field

The present invention relates to information processing apparatuses.

SUMMARY

According to an aspect of the invention, there is provided an information processing apparatus including a first controller and a second controller. The first controller performs processing dependent on hardware having a function. The second controller is connected to the first controller via a communication path and performs processing not dependent on the hardware. The second controller stores an execution command in a storage device. The execution command is for executing processing and has a format not dependent on the hardware. The first controller includes a converter, a memory controller, and an operation controller. The converter acquires the execution command from the storage device and converts the execution command into a command for controlling the hardware and dependent on the hardware. The memory controller writes the converted command into a memory. The operation controller reads the converted command from the memory and controls operation of the hardware.

BRIEF DESCRIPTION OF THE DRAWINGS

An exemplary embodiment of the present invention will be described in detail based on the following figures, wherein.

DETAILED DESCRIPTION

Figure 1:
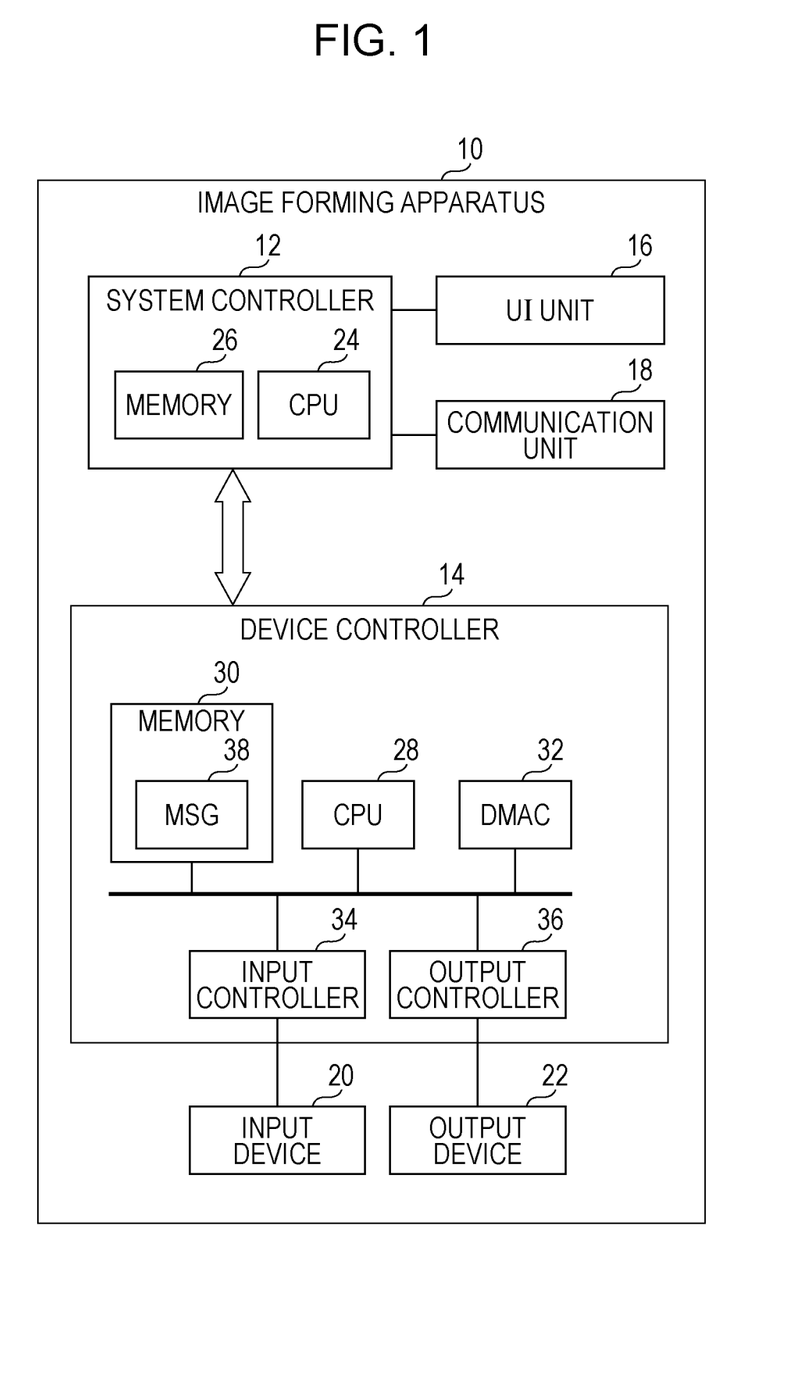
FIG. 1 is a block diagram illustrating an image forming apparatus according to an exemplary embodiment of the present invention.

An image forming apparatus as an example of an information processing apparatus according to an exemplary embodiment will now be described with reference to FIG. 1. FIG. 1 illustrates an example of the image forming apparatus according to this exemplary embodiment. The information processing apparatus according to this exemplary embodiment is not limited to an image forming apparatus and may be an apparatus other than an image forming apparatus, such as a video recorder, an image playback apparatus (including a video playback apparatus and a still-image playback apparatus), an audio playback apparatus (including a music player), or other digital apparatuses. In the following, an image forming apparatus is described as an example of an information processing apparatus.

An image forming apparatus 10 has an image forming function. Specifically, the image forming apparatus 10 has at least one of a scanning function (i.e., an image reading function), a printing function, a copying function, and a facsimile function. The image forming apparatus 10 may also have a function for communicating with another apparatus.

The following description relates to components included in the image forming apparatus 10.

The image forming apparatus 10 includes one or more hardware units having respective functions, a system controller 12, and a device controller 14. The system controller 12 corresponds to an example of a second controller, and the device controller 14 corresponds to an example of a first controller.

The system controller 12 and the device controller 14 are connected to each other by, for example, a bus (e.g., a high-speed bus, such as Peripheral Component Interconnect (PCI) Express), and exchange various types of information with each other. For example, command information indicating an execution command for executing processing, status information indicating statuses of the respective controllers, and information indicating a detection result of a sensor may be exchanged between the system controller 12 and the device controller 14. The format of the information to be exchanged between the controllers may be selected from multiple predetermined formats. Moreover, the system controller 12 and the device controller 14 may be connected by a dedicated line and may exchange information for synchronizing with each other.

The image forming apparatus 10 includes, for example, a user interface (UI) unit 16, a communication unit 18, an input device 20, and an output device 22 as hardware units. The UI unit 16 includes a display unit and an operable unit. The display unit is a display device, such as a liquid crystal display. The operable unit is an input device, such as a touchscreen or a keyboard. The UI unit 16 may alternatively be a user interface (e.g., an operable panel) functioning both as a display unit and an operable unit. The communication unit 18 is a communication interface and has a function for transmitting data to another apparatus and a function for receiving data from another apparatus via a communication path, such as a network. The communication unit 18 may be a communication interface having a wireless communication function or may be a communication interface having a wired communication function. The input device 20 is, for example, a scanner and reads a document so as to generate image data expressing the document. The output device 22 is, for example, a printer and receives image data or document data so as to form an image or a document onto a recording medium, such as paper. The image forming apparatus 10 may additionally include a fan for cooling the interior of the image forming apparatus 10, a storage device, such as a hard disk or a memory, and so on. The storage device stores therein, for example, various types of data and various types of programs. Needless to say, hardware units other than those mentioned above may be included in the image forming apparatus 10.

The system controller 12 includes a central processing unit (CPU) 24 as an example of a processor and a memory 26 as an example of a storage device, and has a function for performing processing not dependent on the hardware units included in the image forming apparatus 10, that is, a function for controlling common parts that are not dependent on, for example, types of hardware units, individual differences between the hardware units, and differences between products. For example, the system controller 12 performs display and input processes with respect to the UI unit 16 as a hardware unit, communication by the communication unit 18 (e.g., communication with an external apparatus via a communication path, such as a network), processing of image data and device information, image processing, user authentication, and memory management (e.g., reading from a secure digital (SD) card).

The system controller 12 transmits command information indicating an execution command for executing processing (e.g., a job, such as a print job or a copy job) to the device controller 14. The execution command has a format not dependent on the hardware and is, for example, a command described in a language understandable by a user (e.g., a command for performing copying onto a single A4-size sheet with a resolution of 600 dpi). As will be described later, the command information is stored in the device controller 14.

The device controller 14 includes a CPU 28 as an example of a processor, a memory 30 as an example of a storage device, a direct memory access controller (DMAC) 32, an input controller 34, and an output controller 36. The device controller 14 has a function for performing processing dependent on the hardware units included in the image forming apparatus 10, that is, a function for controlling parts unique to the hardware units. For example, the device controller 14 controls the input device 20, the output device 22, a fan, and a post-processing device, such as a stapler, and also controls, for example, a motor, a heater, and a lamp based on information obtained by various types of sensors.

The memory 30 is provided with a message box (MSG) 38 as a storage region. The MSG 38 stores therein the command information transmitted from the system controller 12. The command information is transmitted from the CPU 24 of the system controller 12 to the CPU 28 of the device controller 14 via the MSG 38. Moreover, information other than the command information (e.g., status information) may be exchanged between the CPU 24 of the system controller 12 and the CPU 28 of the device controller 14 via the MSG 38. The MSG 38 corresponds to an example of a storage device.

The CPU 28 of the device controller 14 functions as an example of a converter that reads the command information from the MSG 38 and converts the execution command indicated by the command information into a command that is for controlling the hardware and that is dependent on the hardware. As a result of this conversion, for example, a command containing a parameter to be set in a register for controlling the hardware, an address in the register, and so on is generated.

The DMAC 32 is a direct memory access controller and writes the command obtained as a result of the conversion by the CPU 28 in accordance with the setting by the CPU 28 into the register for controlling the hardware. The DMAC 32 corresponds to an example of a memory controller.

The input controller 34 has a function for controlling the input device 20. For example, the function of the input controller 34 is realized by executing an input control program. The input controller 34 is provided with a register for controlling the input device 20, and a value as the command generated as a result of the conversion of the aforementioned execution command is set in the register. The input controller 34 controls the input device 20 in accordance with the value set in the register. The writing of the value (i.e., command) into the register is performed by the DMAC 32. The input controller 34 may also have a function for performing image processing (e.g., image cutting, shifting, rotation, enlargement, reduction, and compression) on image data generated by the input device 20. The input controller 34 corresponds to an example of an operation controller.

The output controller 36 has a function for controlling the output device 22. For example, the function of the output controller 36 is realized by executing an output control program. The output controller 36 is provided with a register for controlling the output device 22, and a value as the command generated as a result of the conversion of the aforementioned execution command is set in the register. The output controller 36 controls the output device 22 in accordance with the value set in the register. The writing of the value (i.e., command) into the register is performed by the DMAC 32. The output controller 36 may also have a function for performing image processing (e.g., expansion, addition, and adjustment) on image data. The output controller 36 corresponds to an example of an operation controller.

In a case where each hardware unit included in the image forming apparatus 10 does not have a function for executing processing in accordance with a condition designated by an execution command, the device controller 14 may change the contents of the execution command to a command executable by the function included in the hardware unit and control the operation of the hardware unit in accordance with the changed command. This similarly applies to a case where each hardware unit included in the image forming apparatus 10 is not capable of executing processing in accordance with a condition designated by an execution command. For example, in a case where a sheet compatible with a condition designated by an execution command is not accommodated in the image forming apparatus 10, the device controller 14 changes the contents of the execution command such that the processing is executed by using a sheet accommodated in the image forming apparatus 10, and controls the operation of the hardware in accordance with the changed execution command. For example, in a case where an A3-size sheet is designated as a condition of a sheet size, if a sheet tray of the image forming apparatus 10 accommodates an A4-size sheet but not an A3-size sheet, the device controller 14 changes the contents of the execution command such that processing is executed by using the A4-size sheet. For example, in a case where an image is to be printed onto a sheet by executing a print job, the device controller 14 applies image processing on the image so as to change the size of the image to a size compatible with A4 size, and executes the print job in accordance with the changed size.

The operation of the image forming apparatus 10 will be described below. The following description relates to an example of operation when copying is executed. Copying is realized by a combination of scanning (i.e., image reading) and image formation (referred to as "printing" hereinafter) onto a sheet.

First, the system controller 12 transmits command information indicating an execution command for executing processing to the device controller 14 and stores the command information in the MSG 38. The execution command is designated by, for example, a user. The command information contains copying conditions, which include 600 dpi as the resolution, A4 size as the sheet size, the longitudinal direction as the sheet direction (orientation), and one sheet as the number of copies. The command information is stored by performing writing operation at an address in the memory 30 of the device controller 14. When the command information is written into the MSG 38, an interrupt occurs with respect to the device controller 14.

When the CPU 28 of the device controller 14 receives the interrupt, the CPU 28 reads the command information from the MSG 38 and checks whether or not the execution command indicated by the command information is an effective command. In a case where the execution command is an effective command, if the input device 20 and the output device 22 are not operating (e.g., are in an idle state), the operation designated by the execution command is executed. In a case where the input device 20 and the output device 22 are operating, the operation designated by the execution command is executed after the operation of the input device 20 and the operation of the output device 22 end.

In a case where the operation designated by the execution command is copying operation, the copying operation is executed by controlling the input device 20 and the output device 22 based on the copying conditions (i.e., resolution, sheet size, number of copies, and so on) indicated in the command information.

When the copying operation ends and the sheet is output, the device controller 14 stores information indicating the result of the copying operation in the MSG 38. The result is, for example, a successful completion result, an error result, or a retry result of the copying operation. When the information indicating the result is written into the MSG 38 and the MSG 38 is updated, an interrupt signal is generated. The interrupt signal is transmitted to the system controller 12. When the system controller 12 receives the interrupt signal, the system controller 12 checks the MSG 38 and acquires the information indicating the result stored in the MSG 38. The information indicating the result may be displayed on, for example, the UI unit 16. When the device controller 14 detects access to the MSG 38 by the system controller 12, the device controller 14 nullifies the already-executed execution command and deletes the command information indicating the execution command from the MSG 38. If the MSG 38 does not have other command information stored therein, the MSG 38 becomes empty. By deleting the command information indicating the already-executed execution command, a free space in the MSG 38 is ensured.

Figure 2:
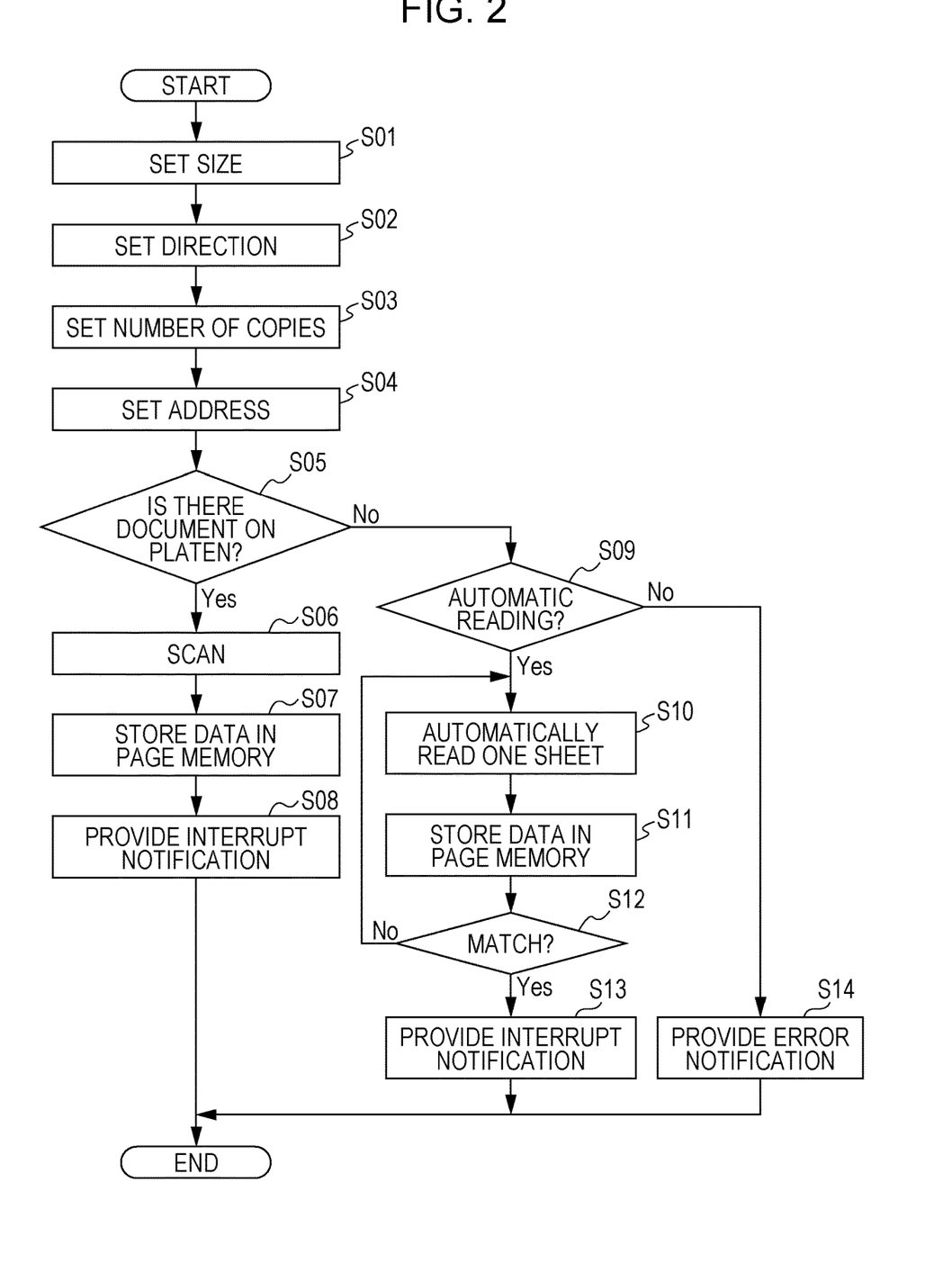
FIG. 2 is a flowchart illustrating operation during scanning.
Figure 3:
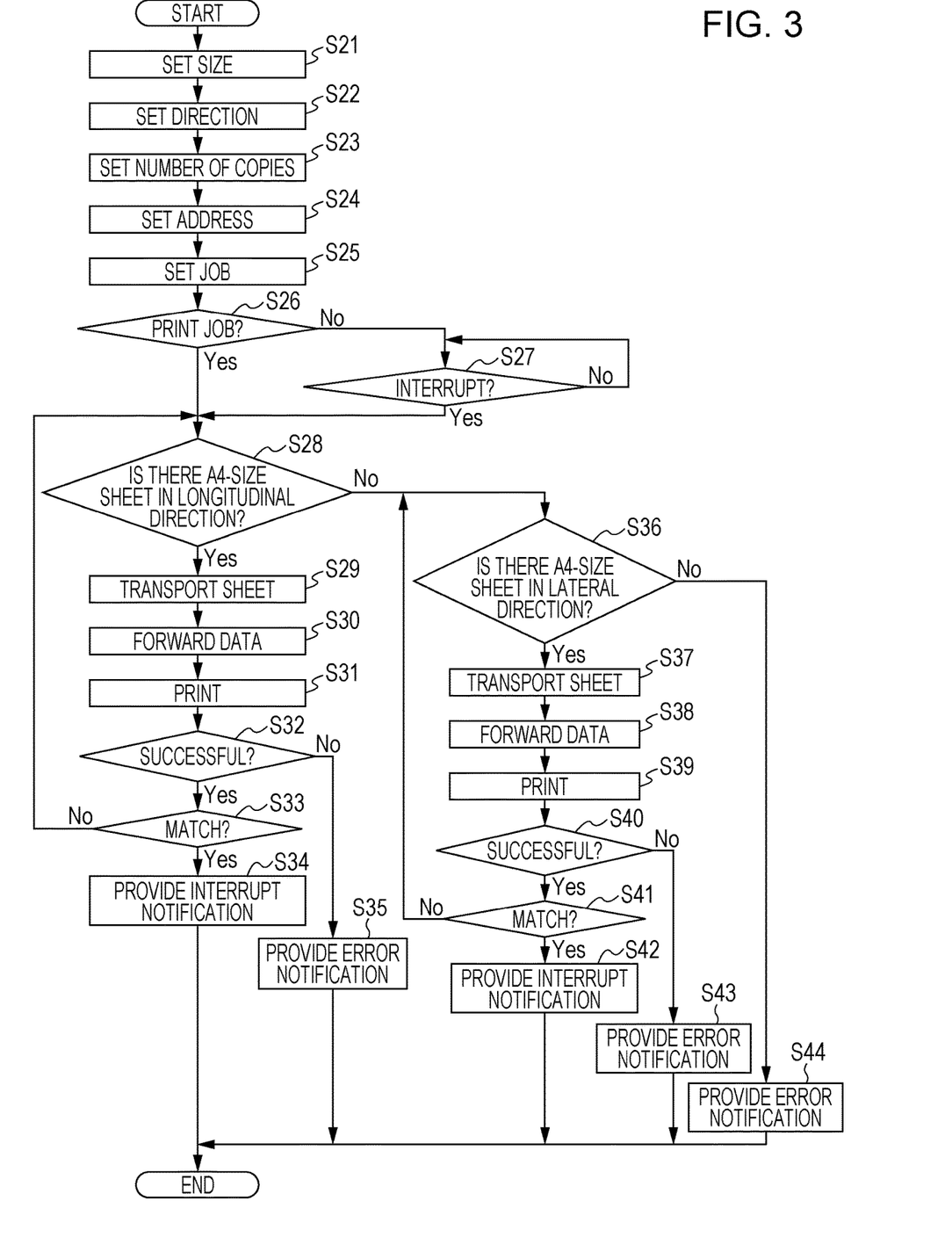
FIG. 3 is a flowchart illustrating operation during printing.

The copying operation will be described in detail below with reference to FIGS. 2 and 3. FIG. 2 is a flowchart illustrating the operation of the image forming apparatus 10 when scanning is executed. FIG. 3 is a flowchart illustrating the operation of the image forming apparatus 10 when printing is executed. The operation during scanning will be described first with reference to FIG. 2, and the operation during printing will be described next with reference to FIG. 3.

When command information indicating an execution command for executing copying is stored in the MSG 38, the CPU 28 of the device controller 14 reads the command information from the MSG 38 and converts the execution command indicated by the command information into a command dependent on the input device 20 and the output device 22. As a result of this conversion, a command containing, for example, a parameter and an address to be set in the registers for controlling the input device 20 and the output device 22 is generated. The command is set in the register of the input controller 34 and in the register of the output controller 36 by the DMAC 32. The input controller 34 controls the input device 20 in accordance with values (i.e., command) set in the register thereof so as to cause the input device 20 to execute scanning (i.e., image reading). The output controller 36 controls the output device 22 in accordance with values (i.e., command) set in the register thereof so as to cause the output device 22 to print the image generated as a result of the scanning onto a sheet.

The following indicates the values (i.e., command) set in the register of the input controller 34.
Resolution register: 600 dpi
Sheet-size register: A4
Sheet-direction register: longitudinal direction
Number-of-copies register: 1
Buffer-address register: 0×1000_0000

When the values set in the register are created as above, the DMAC 32 sets the value indicating A4 to the sheet-size register in the input controller 34 in step S01, sets the value indicating the longitudinal direction to the sheet-direction register in step S02, sets the value indicating 1 copy to the number-of-copies register in step S03, and sets the aforementioned value to the buffer-address register in step S04.

In a case where a document is placed on a platen (i.e., a copy glass surface) of the image forming apparatus 10 and the document is detected by a sensor (Yes in step S05), the operation proceeds to step S06. In this case, scanning is executed in step S06 on the document placed on the platen in accordance with the conditions designated by the execution command (i.e., resolution: 600 dpi, sheet size: A4 size, sheet direction: longitudinal direction, and number of copies: 1). Image data generated as a result of the scanning (i.e., image data generated by reading the document) is converted into digital data, and one sheet worth of data is sequentially stored in a page memory in step S07 from the address indicated by the buffer-address register. When the scanning is completed, an interrupt occurs in step S08, and the scanning ends.

In a case where a document is not placed on the platen (No in step S05), that is, in a case where the sensor does not detect a document on the platen, the operation proceeds to step S09. In a case where a document is placed in an automatic feeder provided in the image forming apparatus 10 and the document is detected by a sensor (Yes in step S09), the operation proceeds to step S10, and automatic-feed scanning operation is executed thereafter. First, the number of cumulative read pages is initialized. Then, one sheet of document is fed, and scanning is executed by the automatic feeder in step S10 in accordance with the conditions designated by the execution command (i.e., resolution: 600 dpi, sheet size: A4 size, sheet direction: longitudinal direction, and number of copies: 1). Image data generated as a result of the scanning is converted into digital data, and one sheet worth of data is sequentially stored in the page memory in step S11 from the address indicated by the buffer-address register. When one sheet worth of scanning is completed, a value of 1 is added to a cumulative-number-of-pages counter. In a case where the value of the cumulative-number-of-pages counter matches the value set in the number-of-pages register (Yes in step S12), that is, in a case where the number of scanned sheets reaches the number of copies set as a condition, an interrupt occurs in step S13, and the scanning ends. In a case where the value of the cumulative-number-of-pages counter does not match the value set in the number-of-pages register (No in step S12), that is, in a case where the number of scanned sheets has not reached the number of copies set as a condition, the operation returns to step S10.

In a case where a document is not placed in the automatic feeder (No in step S09), that is, in a case where the sensor does not detect a document in the automatic feeder, it is determined that document preparation is ineffective, and an error notification occurs in step S14. In this case, the scanning is abnormally terminated.

The operation during printing will be described below with reference to FIG. 3.

The following indicates the values (i.e., command) set in the register of the output controller 36.

Resolution register: 600 dpi
Sheet-size register: A4
Sheet-direction register: longitudinal direction
Number-of-copies register: 1
Buffer-address register: 0×1000_0000
Output job type: copy When the values set in the register are created as above, the DMAC 32 sets the value indicating A4 to the sheet-size register in the output controller 36 in step S21, sets the value indicating the longitudinal direction to the sheet-direction register in step S22, sets the value indicating 1 copy to the number-of-copies register in step S23, sets the aforementioned value to the buffer-address register in step S24, and sets a copy job as the type of output job in step S25.

The output controller 36 waits until data to be output is completely prepared. If the type of output job is a copy job (No in step S26), the preparation of data is determined as being completed based on the occurrence of an interrupt (i.e., the occurrence of an interrupt in step S08 or S13 described above) indicating the end of scanning by the input device 20. When the scanning ends and an interrupt occurs in step S08 or S13 described above (Yes in step S27), the operation proceeds to step S28 and the output controller 36 commences output operation. If an interrupt does not occur (No in step S27), the output controller 36 waits until an interrupt indicating the end of scanning occurs.

If the type of output job is a print job (Yes in step S26), the output controller 36 commences output operation without waiting for the occurrence of an interrupt since the preparation of data is completed simultaneously with the reception of command information.

The output operation from step S28 and onward will be described below. In the output operation, printing is performed in accordance with the conditions designated by the execution command (i.e., resolution: 600 dpi, sheet size: A4 size, sheet direction: longitudinal direction, and number of copies: 1).

The output controller 36 checks whether or not there is a sheet in the sheet tray. If a sheet that satisfies the conditions regarding the sheet size (A4) and the sheet direction (longitudinal direction) designated by the execution command is accommodated in the sheet tray (Yes in step S28), the sheet is transported from the sheet tray to the output device 22 in step S29.

Subsequently, image data compatible with the conditions designated by the execution command (i.e., resolution: 600 dpi, sheet size: A4 size, and sheet direction: longitudinal direction) is forwarded to the output device 22 from the address indicated by the buffer-address register in step S30. In this case, one sheet worth of image data in the page memory is forwarded from the address.

The output device 22 prints one sheet worth of image onto the sheet based on the image data in step S31.

When the above-described forwarding and printing are completed, the output controller 36 checks whether or not there is an abnormality. If the printing is successfully completed (Yes in step S32), one sheet worth of operation is completed. When one sheet worth of operation is completed, a value of 1 is added to the cumulative-number-of-pages counter. In a case where the value of the cumulative-number-of-pages counter matches the value set in the number-of-pages register (Yes in step S33), that is, in a case where the number of printed sheets reaches the number of copies set as a condition, an interrupt occurs in step S34, and the output operation ends. In a case where the value of the cumulative-number-of-pages counter does not match the value set in the number-of-pages register (No in step S33), that is, in a case where the number of printed sheets has not reached the number of copies set as a condition, the operation returns to step S28. In a case where an abnormality occurs (No in step S32), the output controller 36 provides an error notification in step S35, and the operation is abnormally terminated.

In a case where a sheet that satisfies the conditions regarding the sheet size (A4) and the sheet direction (longitudinal direction) designated by the execution command is not accommodated in the sheet tray (No in step S28), if an A4-size sheet whose sheet direction is the lateral direction is accommodated in the sheet tray (Yes in step S36), the sheet is transported from the sheet tray to the output device 22 in step S37, and the process from step S38 and onward is executed. If an A4-size sheet whose sheet direction is the lateral direction is not accommodated in the sheet tray (No in step S36), the output controller 36 provides an error notification in step S44, and the operation is abnormally terminated.

The process from step S38 and onward will be described below.

In a case where a sheet compatible with the sheet direction (longitudinal direction) designated by the execution command is not accommodated in the sheet tray, the process is not executed in accordance with the conditions designated by the execution command. In other words, the process is not executed in accordance with the conditions designated by the execution command depending on the hardware included in the image forming apparatus 10. In this case, the device controller 14 changes the contents of the execution command to a command executable by the hardware included in the image forming apparatus 10, and controls the operation of the hardware in accordance with the changed command.

Since an A4-size sheet whose sheet direction is the longitudinal direction is not accommodated in the sheet tray in the above example, printing according to the sheet direction (longitudinal direction) designated by the execution command is not executed. In this case, if an A4-size sheet whose sheet direction is the lateral direction is accommodated in the sheet tray, the output controller 36 changes the contents of the execution command such that the image based on the image data is printed onto the sheet.

Since the sheet direction designated by the execution command and the direction of the sheet actually accommodated in the sheet tray differ from each other in the above example, the output controller 36 changes the contents of the execution command such that the image is printed onto the actually-accommodated sheet. Specifically, the output controller 36 rotates the image data (e.g., rotates the image by 90°) from the address indicated by the buffer-address register and restores the image data at an address (0×2000_0000).

Subsequently, the image data compatible with the changed conditions (i.e., resolution: 600 dpi, sheet size: A4 size, and sheet direction: lateral direction) is forwarded to the output device 22 from the changed address (0×2000_0000) in step S38. In this case, one sheet worth of image data in the page memory is forwarded from the address.

The output device 22 prints one sheet worth of image onto the sheet based on the image data (i.e., image data whose sheet direction is changed to the lateral direction) in step S39.

When the above-described forwarding and printing are completed, the output controller 36 checks whether or not there is an abnormality. If the printing is successfully completed (Yes in step S40), one sheet worth of operation is completed. When one sheet worth of operation is completed, a value of 1 is added to the cumulative-number-of-pages counter. In a case where the value of the cumulative-number-of-pages counter matches the value set in the number-of-pages register (Yes in step S41), that is, in a case where the number of printed sheets reaches the number of copies set as a condition, an interrupt occurs in step S42, and the output operation ends. In a case where the value of the cumulative-number-of-pages counter does not match the value set in the number-of-pages register (No in step S41), that is, in a case where the number of printed sheets has not reached the number of copies set as a condition, the operation returns to step S36. In a case where an abnormality occurs (No in step S40), the output controller 36 provides an error notification in step S43, and the operation is abnormally terminated.

Accordingly, in this exemplary embodiment, an execution command having a format that is not dependent on the hardware is stored in the MSG 38 from the system controller 12, and the device controller 14 reads the execution command from the MSG 38 and converts the execution command into a hardware-dependent command. The operation of the hardware is controlled in accordance with the converted command. Consequently, the system controller 12 is capable of transmitting an execution command for causing the hardware to execute a process to the device controller 14 without being dependent on the hardware or the device controller 14.

Furthermore, in a case where a process according to the contents of an execution command is not executable depending on the hardware included in the image forming apparatus 10, the contents of the execution command are changed to a command executable by the hardware, and the operation of the hardware is controlled in accordance with the changed command, whereby the execution command is executed without being stopped.

The device controller 14 may check the state of hardware used for executing the execution command and generate a command that uses operable hardware in accordance with the check result. Accordingly, the process is executed by using the operable hardware. For example, in a case where the image forming apparatus 10 is provided with multiple sheet trays, the device controller 14 checks the state of each sheet tray (e.g., whether each sheet tray is usable or not) and generates a command for selecting a usable sheet tray (e.g., a sheet tray not used for another process). Consequently, the process is executed by using the usable sheet tray.

In a case where the hardware included in the image forming apparatus 10 does not have a function for executing a process according to an execution command, the device controller 14 may transmit command information indicating the execution command to another image forming apparatus that includes hardware having the function for executing the process according to the execution command and cause the image forming apparatus to execute the execution command. With reference to the example shown in FIG. 3, if a sheet whose sheet direction is the lateral direction is not accommodated in the sheet tray, the device controller 14 transmits command information to an image forming apparatus that accommodates a sheet compatible with the condition designated by the execution command (e.g., an A4-size sheet in the longitudinal direction) and causes the image forming apparatus to execute the execution command. For example, the device controller 14 exchanges status information or hardware-related information with other image forming apparatuses via a communication path, such as a network, so as to acquire information related to the functions of the other image forming apparatuses. The device controller 14 utilizes the information to search for an image forming apparatus having the function for executing the execution command in accordance with the conditions designated by the execution command, and causes the image forming apparatus to execute the execution command. Consequently, the execution command is executed without being stopped.

Furthermore, in a case where hardware for executing a process according to an execution command is executing a process according to another execution command, the device controller 14 may transmit command information indicating the relevant execution command to another image forming apparatus and cause the image forming apparatus to execute the execution command. Consequently, the process according to the execution command is executed without having to wait for the process according to the other execution command to end. The device controller 14 may transmit information related to the other image forming apparatus (e.g., information for identifying the other image forming apparatus or information indicating the installed location thereof) to the system controller 12, and the system controller 12 may cause the UI unit 16 to display the information related to the other image forming apparatus.

The aforementioned MSG 38 does not have to be included in the device controller 14. For example, the MSG 38 may be provided within the image forming apparatus 10 without being included in the system controller 12 or the device controller 14, or may be provided as a relay device outside the image forming apparatus 10. In this case, the system controller 12 stores command information in the MSG 38 as a relay device via a communication path, such as a network, and the device controller 14 acquires the command information from the MSG 38 via the communication path. If the MSG 38 is to be used as a relay device, the command information is linked with apparatus identification information for identifying the image forming apparatus 10 to which the command information is transmitted. The device controller 14 acquires, from the MSG 38 as a relay device, the command information linked with the apparatus identification information indicating the image forming apparatus 10.

In a case where multiple pieces of command information are stored in the MSG 38, for example, execution commands indicating the respective pieces of command information are executed in accordance with the stored order. Depending on the free space in the MSG 38, the system controller 12 may convert the execution commands into hardware-dependent commands on behalf of the device controller 14 instead of storing the command information in the MSG 38, and may transmit the converted commands to the DMAC 32. For example, in a case where the free space in the MSG 38 is smaller than or equal to a predetermined threshold value, the system controller 12 may convert the execution commands into hardware-dependent commands and transmit the converted commands to the DMAC 32. Accordingly, even in a case where the free space in the MSG 38 is smaller than or equal to the predetermined threshold value, the execution commands are transmitted from the system controller 12 to the device controller 14.

Furthermore, in a case where command information is stored in the MSG 38, if an execution command (e.g., a scan job) to be executed by using a hardware unit (e.g., the input device 20) other than a hardware unit (e.g., the output device 22) that is to execute an execution command (e.g., a print job) indicated by the command information is transmitted, the system controller 12 may convert the execution command (e.g., the scan job) into a command that is dependent on the hardware unit (e.g., the input device 20) instead of storing the command information indicating the execution command (e.g., the scan job) in the MSG 38, and may transmit the converted command to the DMAC 32.

Figure 4:
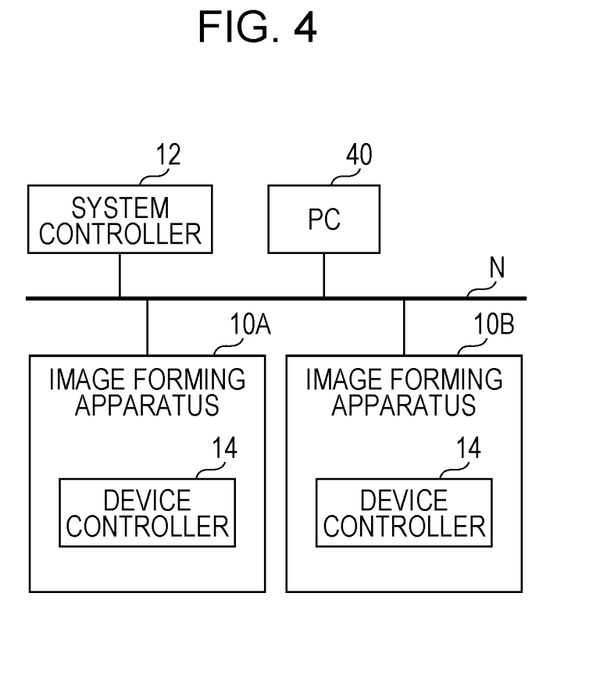
FIG. 4 is a block diagram illustrating an image forming system.

A modification will be described below with reference to FIG. 4. FIG. 4 illustrates an example of an image forming system according to the modification.

The image forming system includes, for example, one or more image forming apparatuses (e.g., image forming apparatuses 10A and 10B) and a system controller 12. The image forming system may also include another apparatus, such as a personal computer (PC) 40. The image forming apparatuses 10A and 10B, the system controller 12, and the PC 40 are connected to one another via, for example, a communication path N, such as a network. In this modification, the system controller 12 is constituted of an apparatus, such as a PC, and is provided outside the image forming apparatuses 10A and 10B. As an alternative to the example shown in FIG. 4 in which a single system controller 12 is included in the image forming system, multiple system controllers 12 may be included in the image forming system. As another alternative, the image forming apparatuses 10A and 10B may respectively include system controllers 12. Moreover, the MSG 38 may be included in each of the image forming apparatuses 10A and 10B or may be connected as a relay device to the communication path N instead of being included in the image forming apparatus 10A or 10B. The system controller 12 may store command information indicating an execution command to be transmitted to the image forming apparatuses 10A and 10B in the MSG 38 of each of the image forming apparatuses 10A and 10B via the communication path N, or may store the command information in the MSG 38 as a relay device. Consequently, command information indicating an execution command to be transmitted to each of the multiple device controllers 14 is stored in the MSG 38. Each device controller 14 may acquire command information transmitted to the relevant image forming apparatus from the MSG 38 in the relevant image forming apparatus, or if the MSG 38 is connected as a relay device to the communication path N, each device controller 14 may acquire command information transmitted to the relevant image forming apparatus from the MSG 38 as a relay device. According to this modification, command information is transmitted to an image forming apparatus from the system controller 12 provided outside the image forming apparatus. Furthermore, in a case where multiple image forming apparatuses are included in the image forming system, command information indicating an execution command to be transmitted to the multiple device controllers 14 is transmitted to each device controller 14 from the system controller 12 via the MSG 38. By applying the above exemplary embodiment in this manner, command information is transmitted from one or more system controllers 12 to one or more device controllers 14.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first controller that performs processing dependent on hardware having a function;
   a second controller that is connected to the first controller via a communication path and that performs processing not dependent on the hardware,
   wherein the second controller stores an execution command in a storage device, the execution command being for executing processing and having a format not dependent on the hardware,
   wherein the first controller includes:
      a converter that acquires the execution command from the storage device and converts the execution command into a command for controlling the hardware and dependent on the hardware;
      a memory controller that writes the converted command into a memory; and
      an operation controller that reads the converted command from the memory and controls operation of the hardware, and
   wherein the second controller converts the execution command into the command dependent on the hardware without storing the execution command in the storage device depending on a free space in the storage device, and transmits the converted command to the memory controller.

2. The information processing apparatus according to claim 1,
   wherein the first controller checks a state of the hardware used for executing the execution command and generates a command for using the hardware that is operable.

3. The information processing apparatus according to claim 1,
   wherein the first controller stores a result of the execution command in the storage device, and
   wherein the second controller acquires the result from the storage device.

4. The information processing apparatus according to claim 1,
   wherein the second controller stores, in the storage device, an execution command to be transmitted to each of a plurality of first controllers.

5. An information processing apparatus comprising:
   a first controller that performs processing dependent on hardware having a function;
   a second controller that is connected to the first controller via a communication path and that performs processing not dependent on the hardware,
   wherein the second controller stores an execution command in a storage device, the execution command being for executing processing and having a format not dependent on the hardware,
   wherein the first controller includes:
      a converter that acquires the execution command from the storage device and converts the execution command into a command for controlling the hardware and dependent on the hardware;

a memory controller that writes the converted command into a memory; and an operation controller that reads the converted command from the memory and controls operation of the hardware, wherein the first controller stores a result of the execution command in the storage device, wherein the second controller acquires the result from the storage device, and wherein, in a case where the second controller accesses the storage device, the first controller deletes the execution command from the storage device.

6. An information processing apparatus comprising:

a first controller that performs processing dependent on hardware having a function;

a second controller that is connected to the first controller via a communication path and that performs processing not dependent on the hardware, wherein the second controller stores an execution command in a storage device, the execution command being for executing processing and having a format not dependent on the hardware, wherein the first controller includes:

a converter that acquires the execution command from the storage device and converts the execution command into a command for controlling the hardware and dependent on the hardware;

a memory controller that writes the converted command into a memory; and an operation controller that reads the converted command from the memory and controls operation of the hardware, and wherein, in a case where the hardware does not have a function for executing processing according to the execution command, the first controller changes contents of the execution command to a command executable by the function included in the hardware and controls operation of the hardware in accordance with the changed command.

7. An information processing apparatus comprising:

a first controller that performs processing dependent on hardware having a function;

a second controller that is connected to the first controller via a communication path and that performs processing not dependent on the hardware, wherein the second controller stores an execution command in a storage device, the execution command being for executing processing and having a format not dependent on the hardware, wherein the first controller includes:

a converter that acquires the execution command from the storage device and converts the execution command into a command for controlling the hardware and dependent on the hardware;

a memory controller that writes the converted command into a memory; and an operation controller that reads the converted command from the memory and controls operation of the hardware, and wherein, in a case where the hardware does not have a function for executing the processing according to the execution command, the first controller transmits the execution command to another apparatus that includes hardware having the function for executing the processing according to the execution command and causes the another apparatus to execute the execution command.

8. An information processing apparatus comprising:

a first controller that performs processing dependent on hardware having a function;

a second controller that is connected to the first controller via a communication path and that performs processing not dependent on the hardware, wherein the second controller stores an execution command in a storage device, the execution command being for executing processing and having a format not dependent on the hardware, wherein the first controller includes:

a converter that acquires the execution command from the storage device and converts the execution command into a command for controlling the hardware and dependent on the hardware;

a memory controller that writes the converted command into a memory; and an operation controller that reads the converted command from the memory and controls operation of the hardware, and wherein, in a case where the hardware for executing the execution command is executing another execution command, the first controller transmits, to the second controller, information related to another apparatus that includes hardware having the function for executing the processing according to the execution command.

9. An information processing apparatus comprising:

first control means for performing processing dependent on hardware having a function;

second control means, connected to the first control means via a communication path, for performing processing not dependent on the hardware, wherein the second control means stores an execution command in a storage device, the execution command being for executing processing and having a format not dependent on the hardware, wherein the first control means includes:

converting means for acquiring the execution command from the storage device and converting the execution command into a command for controlling the hardware and dependent on the hardware;

memory control means for writing the converted command into a memory; and operation control means for reading the converted command from the memory and controlling operation of the hardware, wherein the second control means converts the execution command into the command dependent on the hardware without storing the execution command in the storage device depending on a free space in the storage device, and transmits the converted command to the memory control means.

* * * * *